Figure 1:
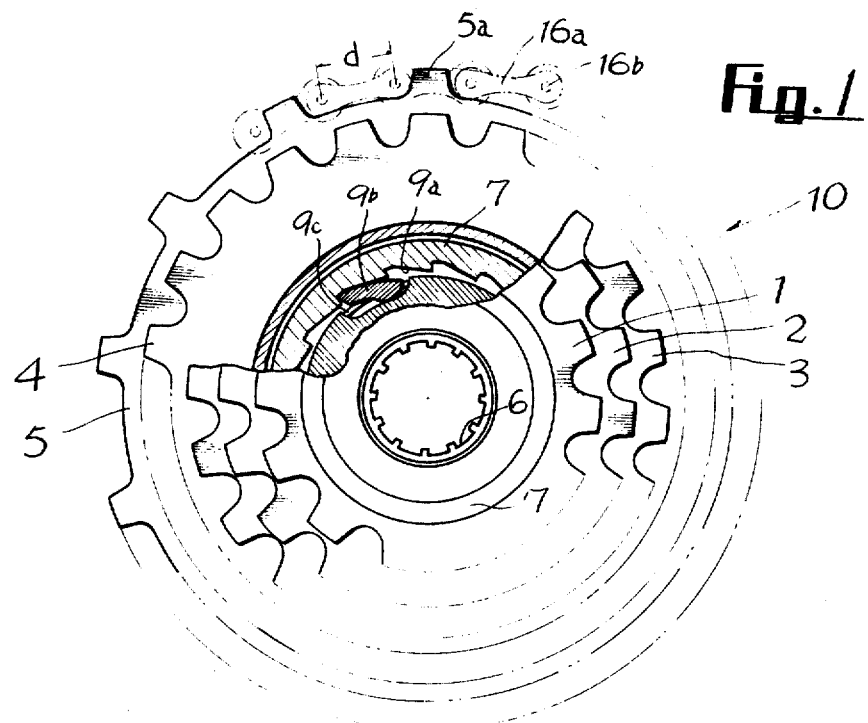

United States Patent
Ohshita

[15] 3,661,021
[45] May 9, 1972

[54] MULTIPLE FREE WHEEL FOR A BICYCLE

[72] Inventor: Masakazu Ohshita, c/o Shimano Industrial Co., Ltd. No. 77, 3-cho, Oimatsu-cho, Sakai City, Japan

[22] Filed: June 4, 1970

[21] Appl. No.: 43,389

[30] Foreign Application Priority Data

July 26, 1969 Japan..................44/71242

[52] U.S. Cl. ..................74/217 B, 74/217 C, 74/217 S, 74/242.15 B
[51] Int. Cl. ..................F16h 11/04, F16h 7/10
[58] Field of Search ..................74/242.15 B, 217 B, 217 C, 74/217 S

[56] References Cited

UNITED STATES PATENTS 3,364,762   1/1968   Maeda..................74/217 B
3,492,883   3/1970   Maeda..................74/217 B

FOREIGN PATENTS OR APPLICATIONS 982,945     2/1951   France..................74/217 B
1,091,193   1/1954   France..................74/217 B Primary Examiner—Leonard H. Gerin
Attorney—McGlew and Toren

[57] ABSTRACT

A multiple free wheel for a bicycle comprising a low speed sprocket wheel and a high speed sprocket wheel, wherein the dents of the low speed sprocket wheel are so formed as to engage with a driving chain at the interval equal to one pitch thereof so that when the driving chain is geared into the high speed sprocket wheel it is not disengaged from the low speed sprocket wheel however big the difference may be in dent number between the two sprocket wheels.

2 Claims, 7 Drawing Figures

INVENTOR.
MASAKAZU OHSHITA

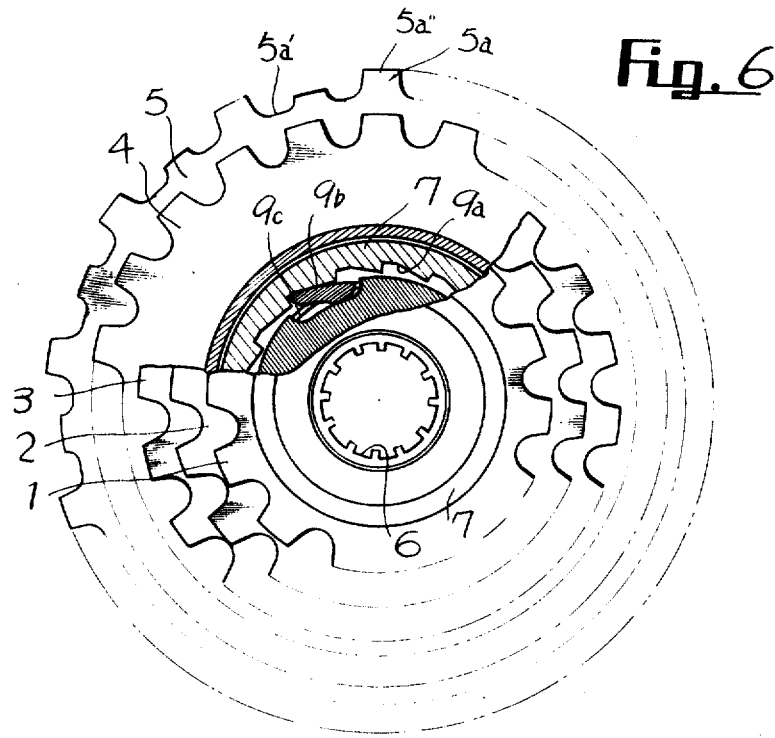
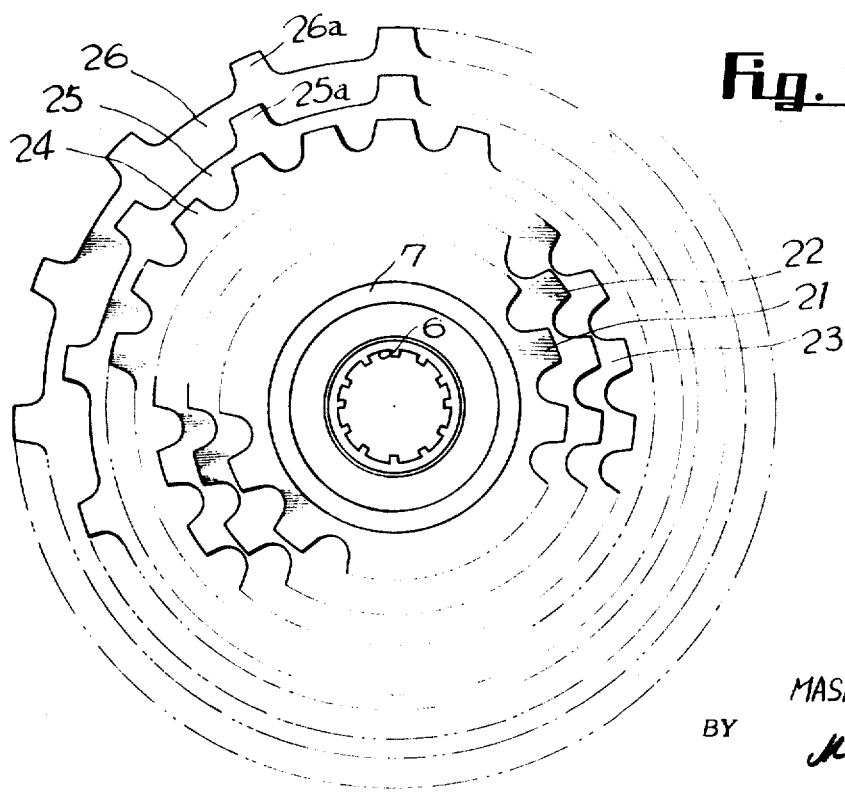

MULTIPLE FREE WHEEL FOR A BICYCLE

This invention relates to a multiple free wheel which is generally mounted on the rear wheel hub of a bicycle and is capable of shifting speed in a multistage sequence by use of the operation of an outer housing gear shift system.

Conventionally speaking, a multiple free wheel for a bicycle comprises a plurality of differently dent-numbered sprocket wheels, a driving element sleeved on said driving element and screwed to the rear wheel hub, and also a ratchet means for transmitting the one-sidedly directed rotation only of the driving element into the driven element; the driving chain driven by the pedal operation through a front gear is engaged with any selected one of said sprocket wheels secured to the driving element thereby to rotate the latter and induce both the driven element and the rear wheel into rotation through the ratchet means, consequently driving the rear wheel to rotate.

Thus speed changing operation is carried out by selectively gearing the driving chain into any free one of the multiple sprocket wheels. Furthermore, when said speed changing operation is under way, the operation of gearing the driving chain into said one of the multiple sprocket wheels is carried out outwardly of the multiple free wheel by the gear shift system secured to the rear wheel frame whereby the driving chain is moved in the axial direction on the side where it is advancing toward the sprocket.

The constitution and practical employment of the above-mentioned type multiple free wheel is conventionally well known and especially remarkable enough is the recent tendency increasingly demanding for a big difference in number of dents to be adapted between the maximum dent-numbered sprocket wheel and the minimum dent-numbered sprocket wheel; for example, against the minimum dent-numbered sprocket wheel composed of fourteen pieces of dents is utilized the maximum dent-numbered sprocket wheel composed of either 28 pieces or 32 pieces of dents. The bigger the difference is made in number of dents, the greater the velocity ratio is obtained, and consequently a cycler can ride up along an incline more comfortably or keep on cycling a plane road at higher speed. On the contrary, however, this increased difference in number of dents is accompanied with a deficiency that when the driving chain is shifted to be geared into any selected one of the sprocket wheels it is easily disengageable out of the dents into which it has been geared.

Accordingly, the present invention aims at eliminating such a deficiency, and one of its main objectives is to provide a multiple free wheel for a bicycle having a greater velocity ratio by giving a bigger difference in number of dents between the maximum dent-numbered sprocket wheel and the minimum dent-numbered sprocket wheel.

It is another objective of the invention to provide a multiple free wheel set free from the deficiency that the driving chain is liable to come off the front gear when it is being shifted into a selected sprocket wheel.

In case aforesaid difference in dent number is especially made greater, the multiple free wheel of conventional type can be averted from the above-mentioned deficiency as long as the gear shift operation of the driving chain is carried out one sprocket wheel after another. However, more often than not in case with the conventional multiple free wheel, the driving chain is shifted at a leap from the lower speed maximum dent-numbered sprocket wheel directly into the higher speed minimum dent-numbered sprocket wheel. Thus when the gear shift operation is made in the above-mentioned manner, the driving chain is very apt to come off the front gear with which it is engaged.

Figure 4:
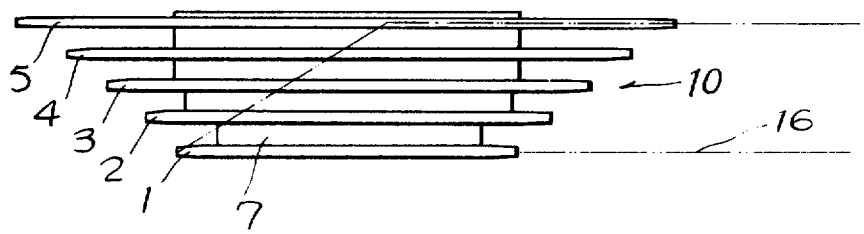
Figure 5:
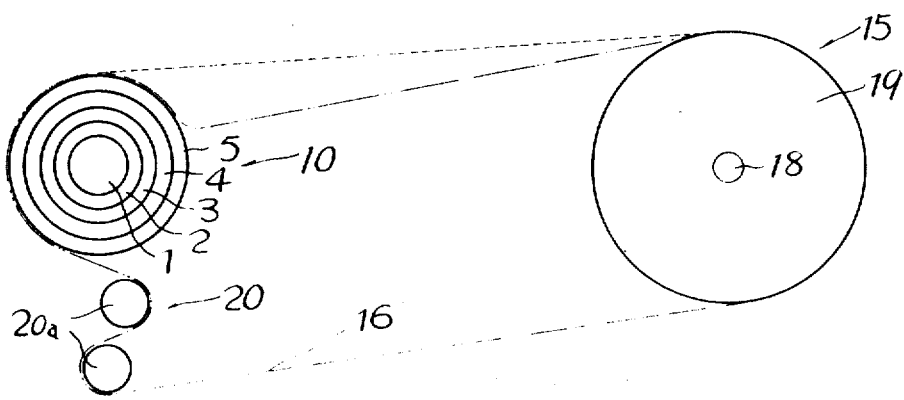

Accordingly, the deliberate investigation has been made into the cause of this frequent disengagement of the driving chain from the front gear to conclude that when the driving chain is shifted at a bound from the lower speed sprocket wheel directly into the higher speed sprocket wheel, some portion of the driving chain is still engaged with the dents of the lower speed sprocket wheel whereas some other portion of the driving chain is early enough to be geared into the higher speed sprocket wheel, so that the driving chain is forced to traverse aslant between these two sprocket wheels as is shown in FIG. 4. At this moment the driving chain verges on departing from the dents of the lower speed sprocket wheel; but the path of the driving chain movement runs aslant with respect to said dents as has been mentioned, and due to this the driving chain is scraped away in the position of said dents and pressed on the dents with which the link plate of the driving chain is engaged, with the result that the driving chain cannot be disengaged from the dents of the low speed sprocket wheel and is forced to rotate in engagement with said dents as is shown in FIG. 5. If in this state the higher speed sprocket wheel is rotated at a predetermined angle, the power of the driving chain to make a straight drive on will overcome the power of the driving chain to engage with said dents of the lower speed sprocket wheel whereby the driving chain thus far engaged is released from engagement abruptly at a bound.

Consequently, a wave-motion is produced on the driving chain and propagated into the front gear to such an extent that it verges to be transmitted beyond the dents of said front gear. On the top of that, the driving chain is pressed on the side of the higher speed sprocket wheel, namely, in the outward direction by means of the outer housing gear shift system; therefore it has also been found that the driving chain comes off the front gear under the influence of the pressing power of the driving chain when the latter has gone beyond the dents of the front gear.

Accordingly, with it in view that the driving chain, when being shifted, is apt to be disengaged from the front gear mainly because it is scraped away by the sprocket wheel dents, the present invention has been made especially to prevent the driving chain from being scraped away by providing the lowest speed maximum dent-numbered sprocket wheel having the dents engageable with the driving chain at the interval equal to each pitch of said dents.

While the particulars of the invention are as explained in the succeeding specification, the novel features and advantages of the invention are as set forth in what is claimed.

Figure 2:
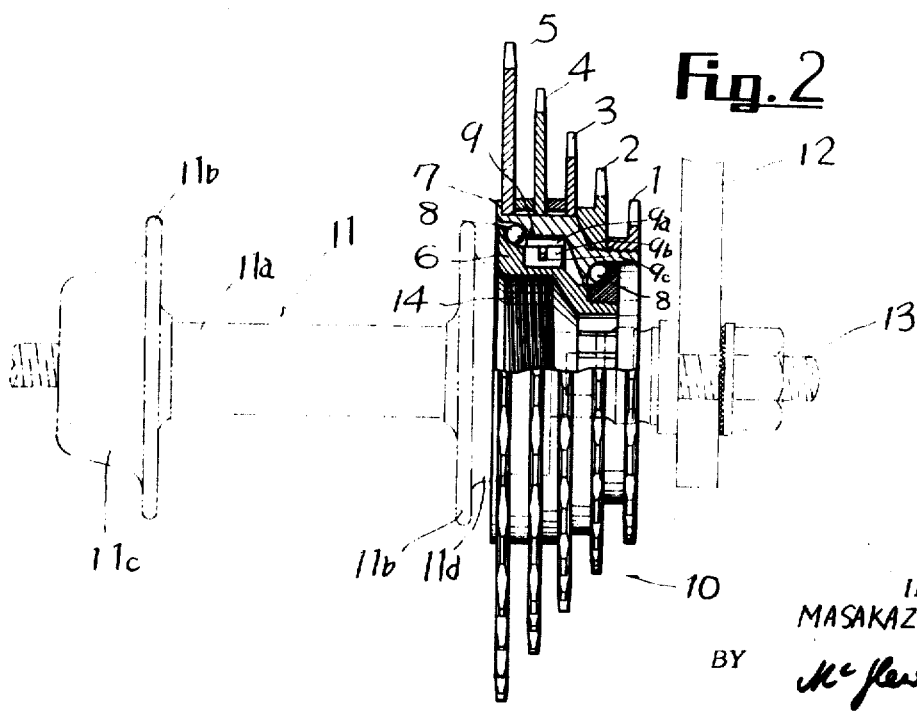
Figure 3:
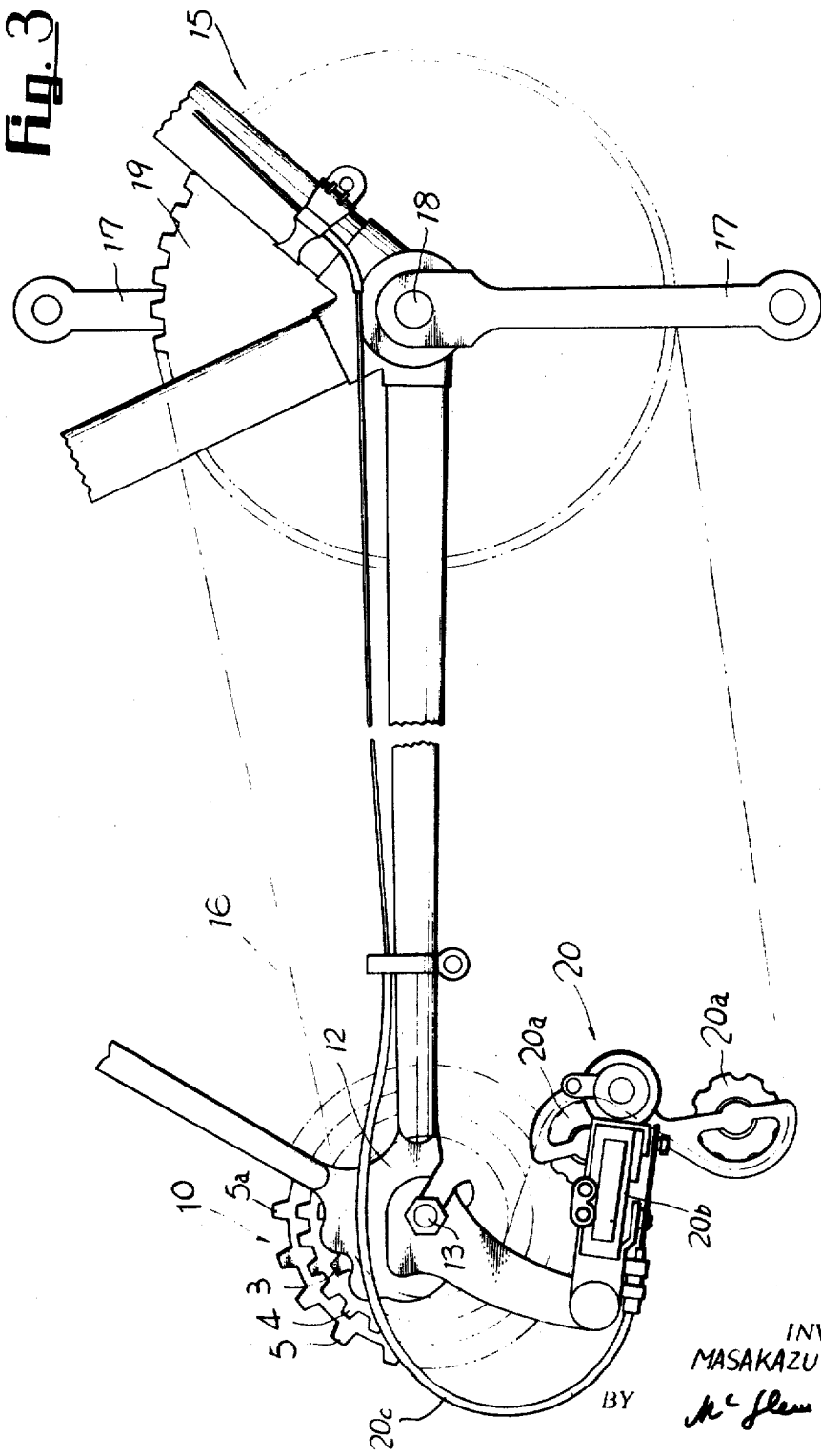

Now accounting for embodied constructions of the invention with reference to the accompanying drawings, FIG. 1 is a front elevation partially showing an example of the free wheel embodied in accordance wit the present invention, FIG. 2 is a vertical cross section thereof, FIG. 3 is a front elevation showing a portion of a bicycle whereupon the free wheel of the invention is mounted, FIGS. 4 to 5 are diagrammatically representations showing respectively the operational state of the conventional driving chain, wherein especially FIG. 4 is an outlined plane view thereof, FIG. 5 is an outlined front elevation thereof, and FIGS. 6 to 7 are both the front elevations showing another embodiments of the invention.

Referring in detail to the free wheel of the present invention with reference to the accompanying drawings, by reference numeral 10 is shown a five-speed bicycle hub transmission free wheel constructed with five sprocket wheels 1, 2, 3, 4 and 5. The dents of these five sprocket wheels 1 thru 5 respectively number 14, 17, 20, 24 and 28 in the order of the smallest diameter sprocket wheel 1 up to the largest diameter sprocket wheel 5.

Incidentally, the above-mentioned dent number is optionally modifiable as occasion demands and when a greater velocity ratio is necessary it can be obtained by further increasing the dent number of the largest diameter sprocket wheel. Furthermore, the number of these sprocket wheels is also optionally determinable and therefore it can be selected as freely as occasion demands. Thus it is to be noted that the dent number is not to be restricted within the five-speed bicycle hub transmission free wheel embodied hereinbefore.

The free wheel designated at numeral 10 in FIG. 2 is practically usable when it is mounted on the rear wheel hub which will be explained hereinafter. Said rear wheel hub is designated at 11, and rotatably mounted on a fixing shaft 13 secured to a bicycle frame 12, being composed of a cylinder portion 11a sleeved on said fixing shaft 13 and a pair of bearing means 11c, 11d provided with a flange 11b supporting one end of the spokes, not shown. Of said two bearing means 11c, 11d, one shown at 11d, (positioned on the right of the drawing) has a screw formed in its outer periphery so that the free wheel 10 is mounted on the rear wheel hub 11 by means of said screw.

The above-mentioned free wheel 10 to be mounted on the rear wheel hub 11 comprises a driven element 6 having a screw portion 14 engageable with a screw formed in the outer circumference of said bearing means 11d of the rear wheel hub 11, a driving element 7 sleeved at a regular interval around the outer circumference of said driven element 6, the sprocket wheels 1 through 5 fixed at a regular interval around the outer circumference of the driving element 7, a ball 8 positioned between said driving element 7 and said driven element 6 and capable of relatively rotating these two elements 6, 7, and also a ratchet means 9 which transmits from the driving element 7 as far as the driven element 6 the clockwise rotation transmitted by any selected one of the sprocket wheels 1 thru 5. Said ratchet means 9 is composed of a ratchet member 9a formed around the outer periphery of the intermediate portion of the driven element 6.

Said ratchet member 9b is normally in mating engagement with said ratchet member 9a. When the driving element 7 is rotated in the clockwise direction, the rotation thereof is transmitted to the driven element 6 while the driving element 7 is in engagement as has been mentioned above. However, when it is rotated in the counter-clockwise direction, the ratchet member 9b slips away on the ratchet member 9a and therefore the rotation of the driving element 7 is not transmitted as far as the driven element 6. Accordingly when the clockwise rotation is transmitted as far as the driving element 7 to rotate the same, the driven element 6 is also rotated simultaneously through the ratchet means 9 so that the rear wheel is rotated by the rear wheel hub 11 through means of the spoke thereby running a bicycle.

The rotation of the driving element 7 is effected by both a driving means 15 shown in FIG. 3 which is driven through the operation of pedal means (not shown), and a driving chain 16 which is engaged with any selected one of the five sprocket wheel 1 thru 5 and transmits the rotation of said driving means 15 as far as said one selected sprocket wheel.

Said driving means 15 comprises a crank 17 provided in its extreme end with pedal means and a front gear 19 secured to a crank shaft 18. The driving chain 16 is mounted on said front gear 19 and said one selected sprocket wheel. Thus the front gear 19 is driven by pedalling to operate the crank 17 so that the driving element 7 is rotated through the driving chain 16 and said one selected sprocket wheel. In order to engage the driving chain 16 selectively with any one of these multiple sprocket wheels 1 thru 5 is employed an outer housing gear shift system 20 in such a manner as is shown in FIG. 3.

Said outer housing gear shift system 20 is displaced outwardly of the free wheel 10 and mounted on one end of the fixing shaft 13 secured to the bicycle frame 12, being composed of an induction wheel 20a transferable in parallel to the axial direction of said fixing shaft 13, a transferring means 20b provided with a pantograph means or the like for transferring said induction wheel 20a in parallel, and a release wire or any similar and suitable release means 20c for transferring said transferring means 20b.

The induction wheel 20a upon which the driving chain 16 is put is firstly transferred by the release wire 20c through the transferring means 20b, and then the driving chain 16 is induced to engage with a desired one of the sprocket wheels 1 thru 5. The free wheel 10 and the above-mentioned usage and operation thereof are all well known in general and therefore not worthwhile to novelty.

Thus the present invention intends to provide the above-mentioned free wheel 10 especially wherein the dent number of the lowest speed maximum dent-numbered sprocket wheel 5 is made increased more than that which is shown in the drawing, or reversely speaking, to provide such a free wheel 10 that is shown in FIG. 7 as having a big difference in dent number from the highest speed minimum dent-numbered sprocket wheel 1, thereby to resolve the knotty subject that, when shifted by the outer housing gear shift system, the driving chain 16 is scraped away by the sprocket wheel dents and consequently disengaged from the front gear 19.

The dents 5a of the lowest speed maximum dent-numbered sprocket wheel 5 are made lacking at the interval of one pitch of the driving chain 16 or at the interval equal to the distance between the pin shafts 16b connecting each link element 16a so that said dents may engage alternately with the driving chain 16. For a fuller understanding, the driving chain 16 is put on the lowest speed maximum dent-numbered sprocket wheel 5 in the manner that every two link elements 16a of the driving chain 16 are engageable with a single one dent 5a of said sprocket wheel 5.

It follows from this therefore that the other link elements 16a adjacent said two link elements 16a engaged with said single one dent 5a are all in the state of being not engaged with or free from said dent 5a.

Accordingly, if the gear shift operation of the driving chain 16 is effected with one bound from the lowest speed maximum dent-numbered sprocket wheel 5, the portion of the driving chain 16 driven into the free wheel 10 will be transferred to said high speed sprocket wheel 1, whereas the other portion of the driving chain 16 is still kept in said lowest speed sprocket wheel 5. However, due to the link element 16a which is free from engagement with the dent 5a of said lowest speed sprocket wheel 5, the position where the driving chain 16 is engaged with the dent 5a is changed so that the bevel of the driving chain 16 against the chain portion moving toward the highest speed sprocket wheel 1 is made easier and consequently the driving chain 16 can be prevented from being frequently scraped away, and is easily released from its engagement with the dent 5a in the position whereto the driving chain 16 is driven out of the free wheel 10.

According to the present invention, therefore, it is possible to avert the driving chain 16 from rotating as it is scraped away thereby to avoid the production of the wave-motion and decrease the disengageableness of the driving chain 16 out of the front gear 19.

With the exception of providing alternately the dents of the lowest speed maximum dent-numbered sprocket wheel 5 by cutting every other dents in their root 5a' as has been explained above, it is also possible to leave said root 5a' uncut and make the top 5a'' of the dents shorter than the pitch diameter thereof.

While reference has been made above just to the lowest speed maximum dent-numbered sprocket wheel 5, the same reference is also correctly applicable to the lower speed second maximum dent-numbered sprocket wheel 4.

The present applicant has experimented to reach the conclusion that a sprocket wheel of twenty dents or less is not so effective as has been explained above, but the more the dent number is of a sprocket wheel, the greater the effect can be exactly expected. With respect to the free wheel 10 embodied in the drawing, the conclusion of this experiment is correctly applicable to the maximum dent-numbered sprocket wheel 5 and the second maximum dent-numbered sprocket wheel 4.

On the other hand, the type of multiple speed transmission is not altogether confined to that of the free wheel 10 disclosed in this invention. Therefore a free wheel for transmitting more multiple speeds such as six speed or seven speeds is applicable to a sprocket composed of three or four wheels.

A free wheel shown in FIG. 7 comprises a sprocket of six wheels 21, 22, 23, 24, 25 and 26. The dents 25a 26a of the two lower speed sprocket wheels 25, 26 of said six wheels are formed so as to engage with the driving chain 16 at the interval corresponding to one pitch thereof.

According to the present invention, it is therefore possible to construct such a free wheel in a much simplified structure that even in case the driving chain is shifted at a leap from a lower speed sprocket wheel directly into a higher sprocket wheel, it is hardly scraped away to come off the lower speed sprocket wheel thereby preventing the driving chain from slipping out of the front gear, consequently enabling a cycler to operate a gear shift system without restriction in the manner convenient to him.

The present invention is not altogether confined within the constructions embodied herein since it is possible to modify these in various other forms to the extent not exceedingly the spirit and purview of the invention defined in which is claimed.

What is claimed is:

1. A multi-speed transmission free wheel for use on a bicycle in combination with a gear-shifting system, comprising a driven member to be secured to a hub means mounted on a bicycle rear wheel, a cylindrical driving means concentrically disposed about and spaced regularly from the outer periphery of said driven member, means disposed in the space between said driven member and said driving member for transmitting the driving force from said driving member to said driven member in one direction only, and a plurality of sprocket wheels mounted on and extending outwardly from said driving member for driving the rear wheel at different rates of speed through the medium of a driving chain which is selectively positionable on said sprocket wheels by the gear-shifting system, each of said sprocket wheels having a different diameter with said sprocket wheel for the highest speed having the smallest diameter and said sprocket wheel for the lowest speed having the largest diameter, said sprocket wheels are regularly spaced a part, said sprocket wheels having dents cut in the outer periphery at regularly spaced intervals in relationship to the pitch dimensions of the driving chain, and at least said sprocket wheel for lowest speed operation which has a greater number of dents than said sprockets wheels for higher speed operation having alternate dents at least partially cut off inwardly from the outer circumferential periphery of the tips of adjacent dents on the same said sprocket wheel.

2. A multi-speed transmission free wheel, as set forth in claim 1, wherein said alternate dents in said sprocket wheel for the lowest speed operation are cut off at the roots thereof.

* * * * *